Patented Feb. 12, 1924.

1,483,856

UNITED STATES PATENT OFFICE.

PAUL BEEBE, OF AKRON, OHIO, ASSIGNOR TO THE GOODYEAR TIRE & RUBBER COMPANY, OF AKRON, OHIO, A CORPORATION OF OHIO.

METHOD OF MANUFACTURING RUBBERIZED FIBER COMPOSITION.

No Drawing.   Application filed November 4, 1922. Serial No. 599,143.

*To all whom it may concern:*

Be it known that I, PAUL BEEBE, a citizen of the United States, and resident of Akron, Ohio, have invented new and useful Improvements in Methods of Manufacturing Rubberized Fiber Composition, of which the following is a specification.

My invention relates to a process of manufacturing a material capable of many useful applications, such as for floor or wall coverings, as a substitute for leather, or for any other purpose to which a tough, flexible, fibrous, porous, water-resistant body may be adapted. More specifically, my invention comprises so treating a quantity of matted rubber covered fibers as to render the resulting product extremely flexible.

The object of my invention is to provide a binding agent for the fibers which shall provide coatings for the individual fibers and shall also provide layers of flexible material intermediate the adjacently disposed fibers so as to permit a relative movement therebetween with a minimum amount of friction.

In practicing my invention, the fibers are first beaten and separated in any suitable manner, such as by a Claflin beater, after which they are mixed in a solution consisting of rubber and a rubber solvent, such, for example, as toluol. The mixture is then treated with any one of a number of agents, which subsequently serves to cause jellation thereof. This may be accomplished by mixing with the fiber-rubber-solvent mixture a quantity of sulphur dioxide and a quantity of hydrogen sulphide. These gases are admitted in approximately the proportions of 30 cc. of sulphur dioxide and 60 cc. of hydrogen sulphide for each gram of rubber present. After the addition of the hydrogen sulphide, sulphur dioxide is again added to the mixture, approximately 240 cc. for each gram of rubber being added at this time. After a period of approximately one hour has elapsed, an additional quantity of hydrogen sulphide is added to the mixture, approximately 800 cc. per gram of rubber in the mixture.

The rubber in the mixture is then precipitated upon the fibers contained therein, either by the addition of a rubber precipitant, such as alcohol or acetone, or by suitable control of the temperature of the mixture, or in any other desired manner. After the rubber has been precipitated on the fibers, they are arranged into a mat formation by means of a Fourdrinier machine, or any other mat forming device, which serves to remove any excess liquid therefrom.

After the material has been formed into a mat with the excess liquid removed therefrom, it is immersed in a mixture in which a rubber solvent predominates and permitted to remain in that condition until a solid jell is formed, the hydrogen sulphide and sulphur dioxide cooperating to produce the jellation and also producing a slow cure of the rubber. After a suitable jell has been produced, the resulting mixture is treated with alcohol which serves to displace the solvent contained in the rubber and cause it to shrink upon the fibers. This serves to deposit a thin coating of rubber on each of the individual fibers and also intermediate the adjacent fibers, thus eliminating any friction which would develop if the fibers were in direct contact. The rubber serves as a resilient binder and lubricant between adjacent fibers. This permits of freedom of movement of the fibers with respect to each other upon the application of a very slight force, thus producing a very flexible material. The material is dried after passing through the jellation and rubber shrinking processes. The cure of the rubber is brought about by the interaction of the sulphur dioxide and hydrogen sulphide already contained in the mixture and which are instrumental in producing jellation of the fibers. In shrinking the rubber upon the fibers, it is advisable to employ first a mixture in which the alcohol or other rubber precipitant predominates by a relatively small percentage, and to employ, subsequently, mixtures of gradually increasing percentages of alcohol.

Jellation of the rubber coated fibers may be produced by the use of sulphur chloride, zinc ethyl xanthate, or any other suitable agent having similar properties.

Although I have described in detail but a single form which my invention may assume, it will be obvious to those skilled in the art that it is not so limited, but that various minor modifications and changes may be made therein without departing from the spirit of my invention, or from the scope of the appended claims.

What I claim is:

1. The method of making a rubberized fibrous material which consists in depositing a quantity of rubber on a quantity of fibers, permitting the resultant mass to jell, and treating it with means for causing shrinkage of the rubber.

2. The method of making a rubberized fibrous material which consists in precipitating rubber upon a quantity of fibers, causing jellation of said fibers and rubber and treating them with alcohol.

3. The method of making a rubberized fibrous material which consists in depositing a quantity of rubber on a quantity of fibers, treating said fibers with a jelling agent, and subsequently treating them with alcohol.

4. The method of making a fibrous material which consists in associating a quantity of fibers and a quantity of rubber in solution, precipitating the rubber upon the fibers, causing jellation of said rubber and said fibers and treating the resultant mass with alcohol.

5. The method of making a fibrous material which consists in associating a quantity of fibers and a quantity of rubber in solution, precipitating the rubber upon the fibers, causing jellation of said rubber and said fibers, and treating the resultant mass with a rubber precipitant.

6. The method of making a rubberized fibrous material which consists in mixing a quantity of fibers and a rubber solution, precipitating the rubber upon the fibers, straining the rubber coated fibers from the liquid causing the same to jell, and treating the resulting mass with means for shrinking the rubber around the fibers.

7. The method of making a rubberized fibrous material which consists in mixing together a quantity of fibers and a mixture of rubber and rubber solvent, precipitating the rubber upon the fibers, straining the rubber coated fibers from the liquid and permitting them to jell, and treating them with means for displacing the rubber solvent in the rubber.

8. The method of making a rubberized fibrous material which consists in mixing together a quantity of fibers, a quantity of rubber solution and a jelling agent, precipitating the rubber upon the fibers, straining the fibers from the liquid and permitting them to jell, and treating them with alcohol.

9. The method of making a rubberized fibrous material which consists in mixing together a quantity of fibers, a quantity of rubber solution, sulphur dioxide, and hydrogen sulphide, precipitating the rubber upon the fibers, straining the fibers from the liquid and permitting them to jell, and treating them with alcohol.

10. The method of making a rubberized fibrous material which consists in mixing together a quantity of fibers, a quantity of rubber solution, a curing agent, precipitating the rubber upon the fibers, straining the fibers from the liquid and permitting them to jell, and treating them with alcohol.

11. The method of making a rubberized fibrous material which consists in mixing together a quantity of fibers, a quantity of rubber solution, sulphur dioxide and hydrogen sulphide, precipitating the rubber upon the fibers, straining the fibers from the liquid and immersing them in a rubber solvent mix until a solid jell forms, and treating the jelled mass with alcohol.

In witness whereof, I have hereunto signed my name in the presence of two subscribing witnesses.

PAUL BEEBE.

Witnesses:
F. E. JOEL,
FRED A. LIND.